(12) United States Patent
Gordon et al.

(10) Patent No.: US 10,542,010 B2
(45) Date of Patent: Jan. 21, 2020

(54) ACCOUNT VERIFICATION IN DEFERRED PROVISIONING SYSTEMS

(71) Applicant: Microsoft Technology Licensing, LLC, Redmond, WA (US)

(72) Inventors: Ariel Gordon, Kirkland, WA (US); John Erik Araya, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 104 days.

(21) Appl. No.: 15/167,749

(22) Filed: May 27, 2016

(65) Prior Publication Data

US 2017/0346829 A1 Nov. 30, 2017

(51) Int. Cl.
*H04L 29/06* (2006.01)
*G06Q 10/10* (2012.01)
*G06F 21/42* (2013.01)
*G06F 21/31* (2013.01)
*G06F 21/62* (2013.01)

(52) U.S. Cl.
CPC ............ *H04L 63/102* (2013.01); *G06F 21/31* (2013.01); *G06F 21/42* (2013.01); *G06F 21/6281* (2013.01); *G06Q 10/10* (2013.01); *H04L 63/0876* (2013.01); *G06F 2221/2117* (2013.01)

(58) Field of Classification Search
CPC ... H04L 63/102; H04L 63/0876; G06F 21/31; G06F 21/6281; G06F 21/42; G06F 2221/2117; G06Q 10/10
See application file for complete search history.

(56) References Cited

U.S. PATENT DOCUMENTS

| | | |
|---|---|---|
| 7,631,191 B2 | 12/2009 | Glazer et al. |
| 8,505,085 B2 | 8/2013 | Logan et al. |
| 8,640,212 B2 | 1/2014 | Todorov |
| 8,739,261 B2 | 5/2014 | Chao et al. |
| 8,752,148 B1 | 6/2014 | Vipond et al. |
| 8,769,652 B2 | 7/2014 | Buzzard |
| 8,789,153 B2 | 7/2014 | Ganesan |

(Continued)

OTHER PUBLICATIONS

International Search Report and the Written Opinion issued in PCT Patent Application No. PCT/US2017/033895 dated Jun. 30, 2017.

(Continued)

*Primary Examiner* — Cheng-Feng Huang
(74) *Attorney, Agent, or Firm* — Workman Nydegger

(57) ABSTRACT

Provisioning a user account. A method includes, at a local entity contacting an identity system to begin user account provisioning. The method further includes receiving from the identity system a correlating factor related to a verification code sent to the user from the identity system. The method further includes receiving from the user, profile information entered into the local entity, where the profile information is to be stored in the user account. The method further includes receiving from the user the verification code corresponding to the correlating factor. The method further includes sending the correlating factor, user entered verification code and the user entered profile information to the identity system, where the identity system determines that the verification code properly correlates to the correlating factor, and as a result provisions the user account and stores the profile information in the user account.

22 Claims, 5 Drawing Sheets

(56) References Cited

U.S. PATENT DOCUMENTS

| | | |
|---|---|---|
| 8,838,973 B1 | 9/2014 | Yung et al. |
| 9,032,519 B1 | 5/2015 | Maher et al. |
| 9,038,157 B1 | 5/2015 | Santiago et al. |
| 9,154,470 B2 | 10/2015 | Lebron et al. |
| 9,218,476 B1 | 12/2015 | Roth et al. |
| 2004/0205176 A1* | 10/2004 | Ting .............. H04L 67/306 709/223 |
| 2004/0243832 A1* | 12/2004 | Wilf .............. G06F 21/33 726/4 |
| 2007/0260556 A1* | 11/2007 | Pousti ............ G06Q 20/14 705/75 |
| 2007/0289002 A1* | 12/2007 | van der Horst ...... G06F 21/42 726/9 |
| 2011/0185406 A1 | 7/2011 | Hirson et al. |
| 2011/0202984 A1* | 8/2011 | Hird .............. G06F 21/31 726/7 |
| 2012/0090026 A1 | 4/2012 | Andrews et al. |
| 2012/0137360 A1* | 5/2012 | Henderson ...... H04L 63/102 726/17 |
| 2014/0068787 A1 | 3/2014 | Steigmann |
| 2015/0067804 A1* | 3/2015 | Maxwell .......... H04L 63/083 726/7 |
| 2015/0112880 A1* | 4/2015 | Blaylock, IV ...... G06Q 50/01 705/319 |
| 2015/0312236 A1* | 10/2015 | Ducker ............ H04L 63/08 726/4 |
| 2016/0182479 A1* | 6/2016 | Kaplan ............ H04L 51/046 726/6 |
| 2016/0241536 A1* | 8/2016 | Parman ............ H04L 67/02 |
| 2017/0060851 A1* | 3/2017 | Lai .............. G06F 16/3337 |
| 2017/0070510 A1* | 3/2017 | Ramalingam ...... H04L 63/08 |

OTHER PUBLICATIONS

Wawro, Alex, "How to set up two-factor authentication for Facebook, Google, Microsoft, and more", Published on: Apr. 25, 2013, Available at: http://www.pcworld.com/article/2036252/how-to-set-up-two-factor-authentication-for-facebook-google-microsoft-and-more.html.

* cited by examiner

ACCOUNT VERIFICATION IN DEFERRED PROVISIONING SYSTEMS

BACKGROUND

Background and Relevant Art

Computers and computing systems have affected nearly every aspect of modern living. Computers are generally involved in work, recreation, healthcare, transportation, entertainment, household management, etc. Users can often create accounts on on-line services to use the functionality of the services. Such accounts often store Personally Identifiable information (PIT) that needs to be protected by certain safeguards as part of best business practices, but also in many cases due to industry and/or government requirements. For example, the Health Insurance Portability and Accountability Act (HIPAA) privacy laws may require certain safeguards to be in place for PII that includes medical information. Implementing protective safeguards can be expensive in terms of computing resources, so there may be a desire to minimize the data for which safeguards are required.

In most online identity systems, users can create an account in a sign-up form using their email address or their phone number as a sign-in string. To ensure that users do not squat on other people's email or phone numbers, most systems require that users verify that they own this email address and/or phone number they are trying to sign-up with. For example, this can be done by sending a text message with a code to the user, and asking the user to enter the code back into the sign-up form. To verify an email address, systems historically sent an email with a link that the user had to click. Clicking the link would mark the account as "verified". Recently, the industry has moved to code based and in-line verification. This means sending a code to the user inside of an email message, and asking the user to enter this code in the sign-up form. The benefits of doing this are evident when sign-up happens in a hosted flow, for example inside of an app. In-line verification allows users to stay in the sign-up flow, while clicking on a link in an email would open a new web browser window, breaking the in-app sign-up experience.

One important engineering consideration with email or phone verification relates to whether or not the system should wait until the user has verified the code to provision the account in the identity system. One option is to provision the account as "un verified" and prevent the user from using it until verification happens. The concern with this approach is that it forces the system to be engineered to support concurrent sign-ups with the same email address or phone number such that multiple accounts for the same email address or phone number exist. Such a system may be forced to implement expensive protective safeguards for one or more accounts as they may contain PII and credentials, even though those accounts may end up never being verified and used, which requires protection under certain laws, regulation, or best practices.

An alternative is to wait until the user has proven ownership of the email address or phone number before provisioning the account. The simplest way of doing this is to wait until the user verified ownership of the email (for example) until asking her to create a password and provide profile information. This can result in a less acceptable user experience.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for provisioning a user account. The method includes contacting an identity system to begin user account provisioning. The method further includes receiving from the identity system a correlating factor related to a verification code sent to the user from the identity system. The method further includes receiving from the user, profile information entered into the local entity, where the profile information is to be stored in the user account. The method further includes receiving from the user the verification code corresponding to the correlating factor. The method further includes sending the correlating factor, user entered verification code and the user entered profile information to the identity system, where the identity system determines that the verification code properly correlates to the correlating factor, and as a result provisions the user account and stores the profile information in the user account.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may implement a system where a user account is not provisioned at an identity system until an email address or phone number (or other user account, identifier) is verified, but still allows the user to provide profile information (which may include information that needs to be protected) and/or password information, while minimizing the need to store and protect such information at the identity system. In particular, the profile information is stored locally at a local entity (e.g., a browser or app) until the user is able to enter a verification code. The identity system sends the verification code to the user out of band, such as to their phone or email account. The identity system also sends a correlating factor (such as a hash code created from the verification code and/or session identifier) to the local entity, which is stored at the local entity. Once the user enters the verification code, the verification code, correlating factor, and profile information are all sent to the identity system. The identity system can then verify that the verification code and the correlating factor match, and then provision the account, including storing the profile information at the identity system in such a way that the profile information is appropriately protected. In this way, the identity system will only need to store and protect valid profile information for profiles that have been verified rather than storing and protecting potentially invalid profile information for profiles that have not been verified. This results in a more efficient identity system that can be implemented with less storage and other resources used to protect user information It also avoids having to store PII for multiple accounts until such accounts are effectively verified.

Figure 1:
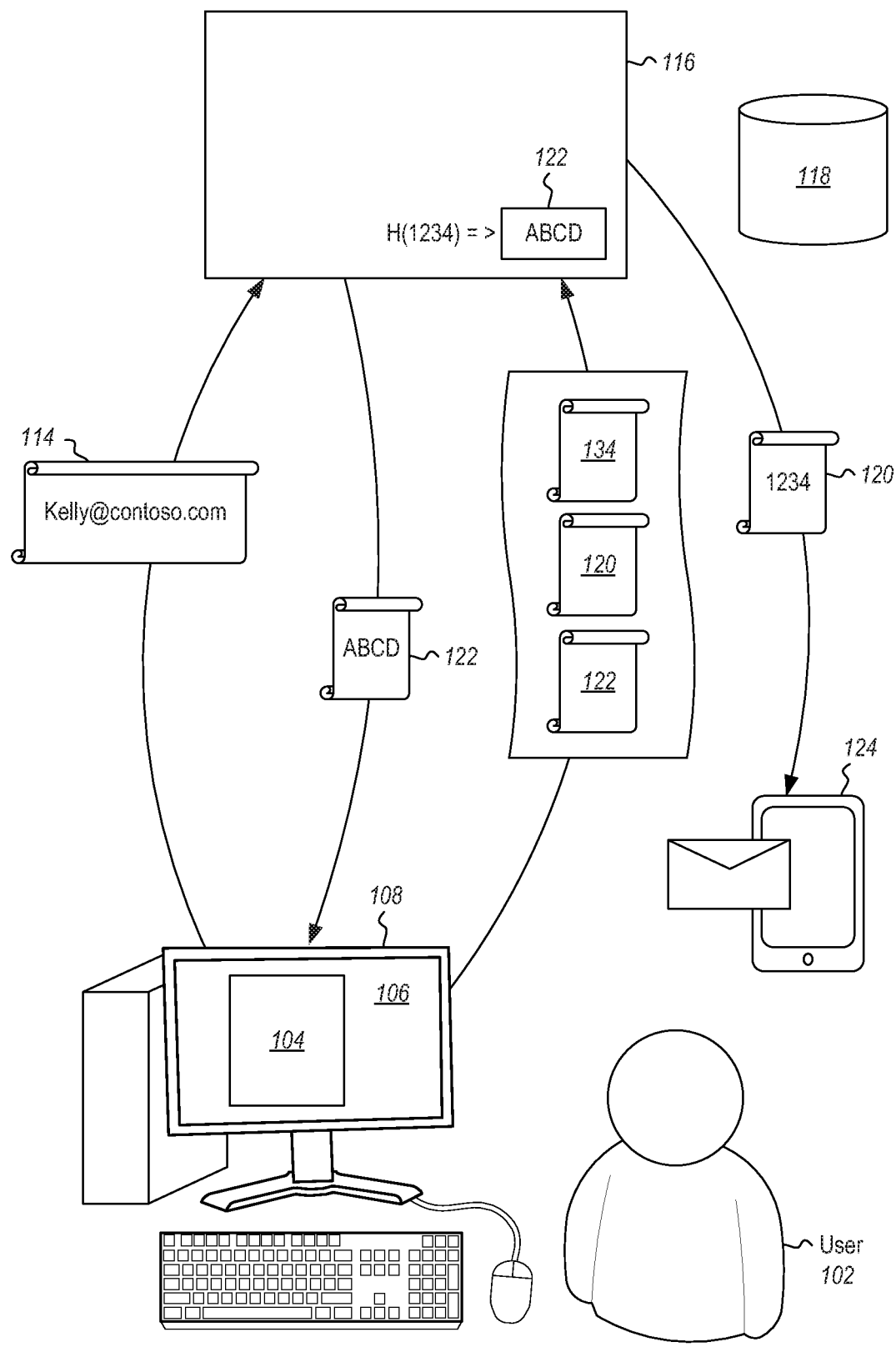
FIG. 1 illustrates a user interacting with a computing system to create an account at an identity system.

An example scenario is now illustrated. Reference is made to FIG. 1. FIG. 1 illustrates that a user 102 is on a sign-up form 104 of a local entity 106 at a local computing system 108. In the illustrated example, the local entity 106 is a browsing application which includes a web browser. However, as illustrated in other examples, the local entity 106 may be an app or other interface mechanism. Thus, although in the illustrated example, the sign-up form 104 is rendered in a browser, it could be a web page shown in a webview of an app (e.g., so that it feels integrated in an app experience), or rendered using native code inside of an app.

Figure 2A:
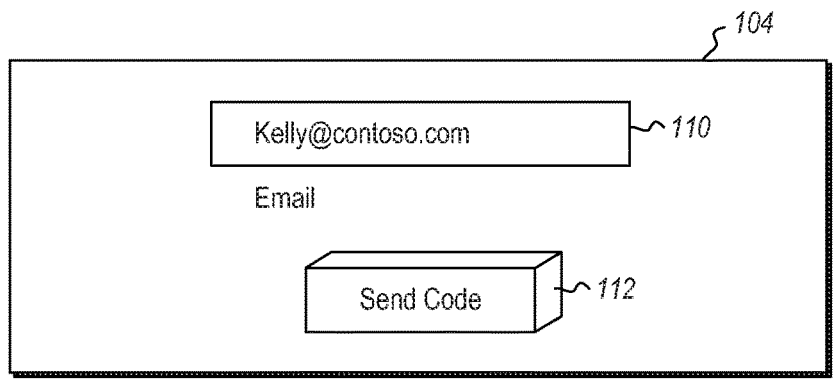
FIG. 2A illustrates a sign-up form.

In the illustrated example, and with reference to FIG. 2A, the user 102 tries to sign-up with an email address 118, in the illustrated example, kelly@contoso.com, by entering the email address in an email field 110 of a sign-up form. The user then selects a send code button 112. As illustrated in FIG. 1, this causes the email address 114 to be sent to the identity system 116. The identity system 116 verifies that there is not already an account stored in a storage system 118 for the identity system 116 with this email address 114.

The identity system 116 generates a verification code 120, which in this case is a random verification code. The identity system 116 also generates a correlating factor 122, which in the illustrated example, generating a correlating factor includes computing a hash of the verification code 120 where the hash of the verification code (or some variant of the hash of the verification code) is the correlating factor.

The identity system 116 sends a clear text version of the verification code 120 to the user 102 out of band (i.e., not to the local entity 106) such as by sending the verification code to the user's email address (or text the verification code to a phone number, if the user is signing up with a phone number instead of an email address). The user 102 may obtain the verification code 120 on a portable computing device 124 such as a cellular telephone having text and/or email functionality, or may even receive the verification code 120 on the local computing system 108 but in a different application than the local entity 106. For example, the user 102 may receive the verification code 120 in an email application or text message application at the local computing system 108.

The identity system 116 sends the correlating factor 122, which in this case is a hashed version of the verification code 120, to the sign-up form 104. In one example embodiment, if the sign-up form 104 is built with HTML, embodiments can include the hashed code correlating factor 122 as a hidden form field 130 (see FIG. 2B) in the sign-up form 104.

Figure 2B:
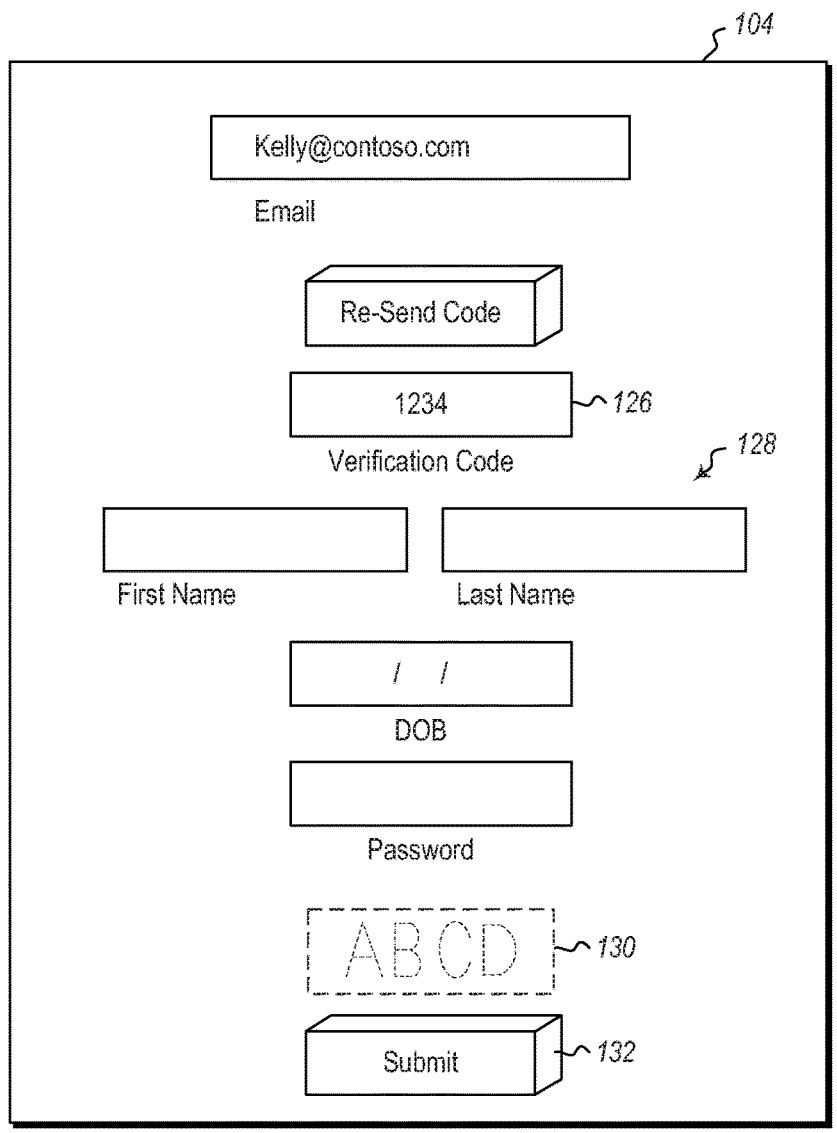
FIG. 2B illustrates the sign-up form in a different state.

As illustrated in FIG. 2B, at the local entity 106 in the sign-up form 104, the user 102 fills in other form fields 128, including things such as (in the illustrated example) a first and last name, a DOB, other profile information and creates a new password. Note that this form can be paginated if needed. Pagination can hide and unhide different portions of the sign-up form. Pagination is only one example of how portions of forms can be hidden or unhidden. For example, in some embodiments, Javascript may be used to modify the contents of the page, or hide and unhide elements on the page.

While the user 102 is filling in information in the sign-up form 104, the verification code 120 arrives via email (or text message), such as at the local computing system 108 or the portable computing device 124. The user enters the clear text verification code 120 received via email (or text message) into the verification code interface element 126 in the sign-up form 104.

The user submits the sign-up form by clicking on the submit button 132. The sign-up form 104 now contains a clear text version of the verification code 120, plus the correlating factor 122, which in this case is a hashed version of the verification code 120, and profile information 134 entered into the sign-up form 104 in the other form fields 128.

At the identity system 116, when this data is received on the server endpoint, the identity system 116 will apply the hashing algorithm to the clear text version of the verification code 120 that was submitted from the local entity 106. Note that the system forming the hashing function and verifying the correctness of the user's provided hash is not necessarily the same system as the identity system. If the result matches the correlating factor 122 that was submitted alongside the clear text version of the verification code 120, it means that the verification code 120 was effectively received by the user, which means that the user has successfully proven that they own the email address (or phone number).

At this point the identity system 116 will provision the account in the identity system. Provisioning the account in the identity system 116 includes storing the profile information 134 in the storage system 118 with any required protective measures. This account is deemed verified.

Embodiments can facilitate handling cases where there are two or more users trying to sign-up with the same email address (or phone number) before one of the users is verified, without needing to store at the identity system profile information for both users.

One option is to generate a different verification code for each user. Only the user who controls the email address (or phone number) and receives the clear text code will be able to submit a form that contains the clear text and the hashed version of the same verification code.

A second option is to generate the verification code as a non-reversible function of the email address or phone number used to sign in. For example, the phone number or email address may have a hashing function applied and a predetermined portion of the hash can be used as the verification code 120. This second approach offers an additional benefit for legitimate users who try to sign-up from two different browsers/devices at the same time. This user will receive two verification emails or text messages, but both will contain the same verification code. This can result in a better user experience.

Embodiments can be implemented, as described above, that do not need to store the verification code 120 that gets sent. The verification code can either be randomly generated for every new sign-up request, or be a hash function of the username (e.g. email address or phone number) that is used to sign-up.

New profile information, including PII and credentials, is persisted in the user's browser until this information is ready to be recorded in the storage system 118.

Embodiments can handle multiple concurrent sign-ups with the same email address or the same phone number, whether this is a malicious case or a legitimate case.

Embodiments implemented as described above can be implemented such that they do not need to provision unverified user accounts, and thus, do not need to remove or update them when they get "verified".

Note that while this implementation may be sufficient for some applications, there are several security implications to consider. For example, the above implementation does not on its own protect against the "brute force" attack of simply replaying the same security hash with every possible security code. This is due to the lack of tracking of "retry" attempts for each code, as well as a lack of expiration times.

The below enhancement describes a mechanism of protecting applications concerned with mitigating this attack vector. While service-side storage is introduced, this mechanism intentionally avoids any user account creation, or temporary storage of PII, until the user's email account has completed the verification process. The stored information can also be cleared on a regular, short-term cadence.

In this advanced flow, embodiments can monitor retry counts to prevent brute force attack. For example, a service may be implemented that is configured to performing the following:

Generating a cryptographically unique correlating factor for all new requests to validate an email address, as well as an associated verification code for this session.

Maintaining a storage table which ties together: the correlating factor, correct verification code, a count of the number of attempts to validate the verification code, and a timestamp of when the session was initiated, Sending the email or text message with the clear text verification code to the user's email inbox, Checking for a given request to validate that a verification code is correct for a given correlating factor (e.g., a session ID), and otherwise increasing the retry count. If the code is incorrect and the retry count is higher than the allowed threshold, the session is terminated, the associated storage for the session is removed from the table, and the user must begin a new session (generating a new correlating factor, verification email, and verification code) if they wish to validate their email address Periodically removing session table entries that are older than a specified age based on the timestamp.

Note that, in this implementation, an account creation service and account verification service may or may not be the same physical service. Separation may be desirable for engineering purposes, or to simply maintain isolation between the account verification service and the account identifier verification service to ensure that the temporary storage of information maintained by the latter cannot possibly contain PII. Additionally, note that in this case, the rest of the flow is largely unchanged, except that the correlating factor sent to the browser/user agent is a session ID instead of a security hash seen in the basic flow.

Figure 3:
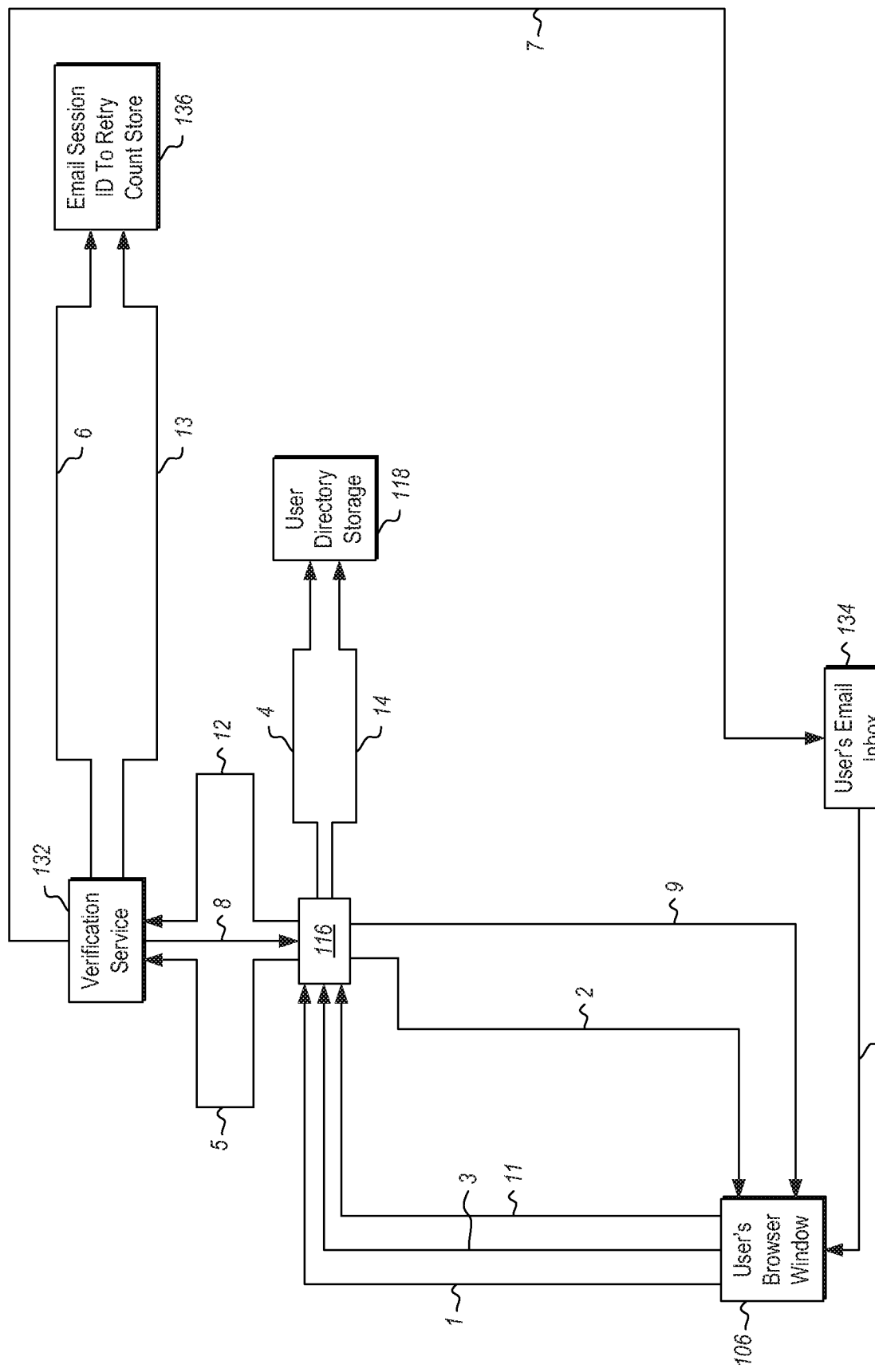
FIG. 3 illustrates an alternate flow for account sign-up and verification.

An overview of this advanced implementation is shown in FIG. 3. In this example, the account identifier verification service 132 is assumed to be a separate entity from the identity system 116. However, it should be appreciated that in other embodiments, the account identifier verification service 132 may be the same entity as the identity system 116.

Referring now to FIG. 3, the user at a local entity 106, which in this case is a browser window, browses to a sign-up form. The sign-up form is provided by an identity system 116, as illustrated at 1.

The identity system 116 displays the page, as illustrated at 2, requesting information from the user such as the user's e-mail address or other account identifier (such as a cellular telephone number) and any other desirable profile information. As illustrated at 3, at the account creation page, the user enters an account identifier (e.g., an email address) to be confirmed and requests a code, such as in the fashion illustrated above with reference to FIG. 2A.

At this point, as illustrated at 4, the identity system 116 will consult the storage 118 to identify that the e-mail address, or other account identifier, is available for creating a user account. If the identity system 116 is able to confirm that the account identifier is available, then the identity system 116 can request that the verification service 132 should send a notification to the user, as illustrated at 5. In this example the notification will be an email sent to the user's email inbox 134, as illustrated at 7. As noted previously, the email inbox 134 may be implemented on a portable computing device 124, on the computing device 108, or on some other computing device.

The verification service 132 generates a new correlating factor (which in some embodiments, may be a session ID) and associated verification code and stores the correlating factor and verification code in storage 136, such as a table indicating that no retry attempts have been performed, as illustrated at 6. The verification service 132, in this example, also sends an e-mail to the user's email inbox 134 (but could send a text message or other message in other embodiments) which includes the verification code that was generated, as illustrated at 7. In the example illustrated in FIG. 3, the verification service 132 sends the correlating factor to the identity system 116, as illustrated at 8. The correlating factor is sent to the local entity 106 as illustrated at 9. In some embodiments, the correlating factor could be sent with the location of the verification service in addition to the correlating factor The correlating factor may be sent as clear text to the local entity 106, although the correlating factor is not necessarily shown to the user.

The user can then open the e-mail in their email inbox 134 to obtain the verification code. The user then enters the verification code into the sign-up form as illustrated at 10.

The user then submits the correlating factor and verification code to the identity system 116 as illustrated at 11.

The correlating factor and verification code are sent to the verification service 132 to be verified for correctness and to increment a retry count as illustrated at 12. The correlating factor is used to look up the verification code and current retry count in the storage 136 as illustrated at 13. If the code is correct, a success message is returned to the identity system 116 which can then create the user account in the storage 118 as illustrated at 14. If the code is incorrect, then the retry count is increased. So long as the retry count is lower than a predetermined threshold retry count, a user is prompted to input the verification code again. If the retry count exceeds the predetermined threshold, then the session is deleted and the user is given a terminal error.

Note that while in this example it is illustrated that the identity system 116 and the verification service 132 are separate entities, it should be appreciated that in other embodiments the account creation service identity system 116 and email verification service 132 could be implemented as a single entity having functionality for correlating factors to verification codes and email accounts.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
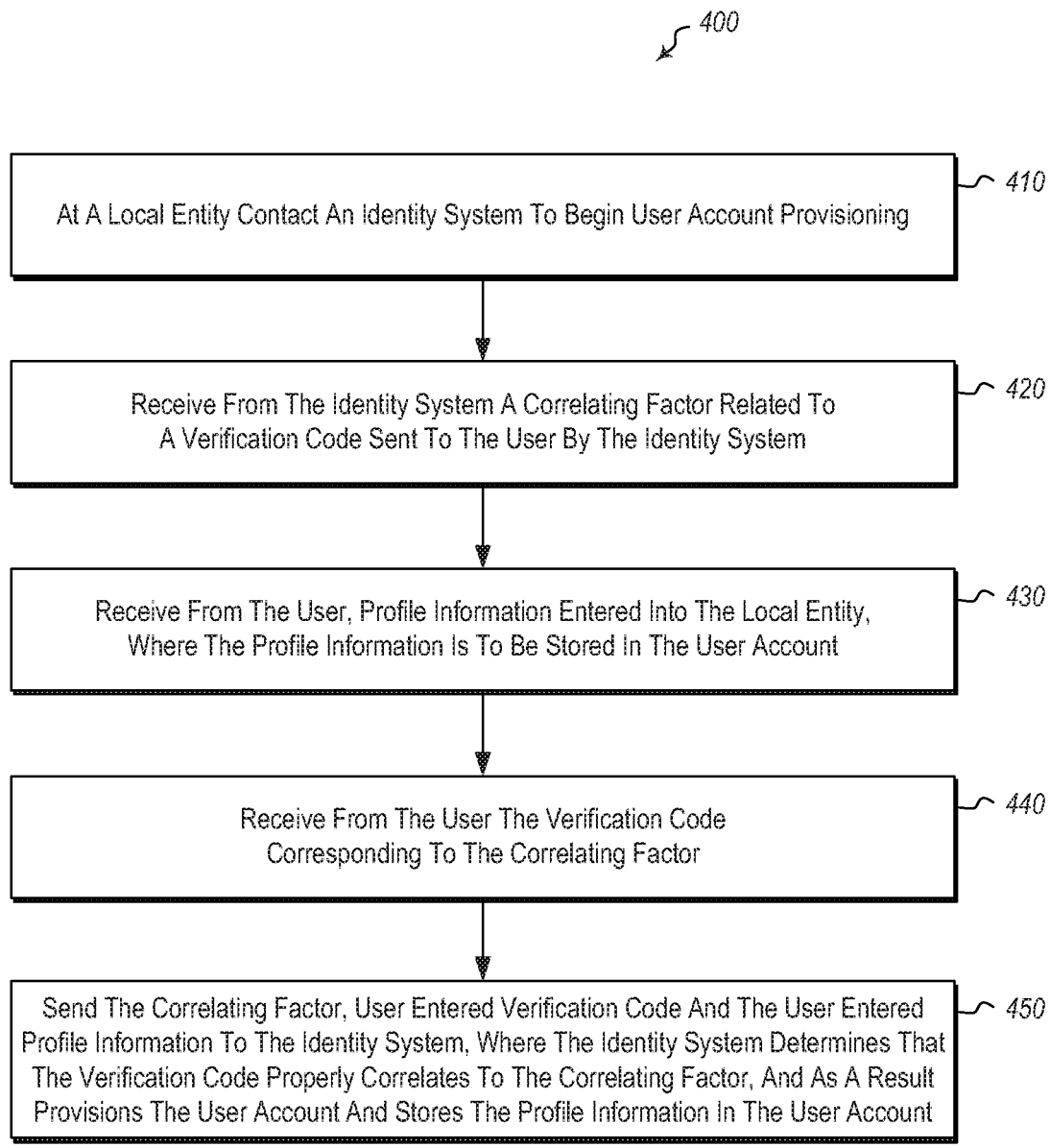
FIG. 4 illustrates a method of provisioning a user account.

Referring now to FIG. 4, a method. 400 is illustrated. The method 400 includes acts for provisioning a user account.

The method 400 includes, at a local entity (such as a browser or app) contacting an identity system to begin user account provisioning (act 410). For example, the user may navigate to sign-up form 104 and enter an account identifier such as enter email address or phone number and click a send code button 112 as illustrated above.

The method 400 further includes receiving from the identity system a correlating factor related to a verification code sent to the user from the identity system (act 420). For example, as illustrated in FIG. 1, a correlating factor 122 may be received at a browser from an identity system 116.

The method 400 further includes receiving from the user, profile information entered into the local entity, where the profile information is to be stored in the user account (act 430). Thus for example, as illustrated in FIG. 2B, the user may enter the name, address, date of birth, proposed password, etc.

The method 400 further includes receiving from the user the verification code corresponding to the correlating factor (act 440). For example, a user can enter the verification code 122 into the element 126 illustrated in FIG. 2B.

The method 400 further includes sending the correlating factor, user entered verification code and the user entered profile information to the identity system, where the identity system determines that the verification code properly correlates to the correlating factor, and as a result provisions the user account and stores the profile information in the user account (act 450). For example, as illustrated in FIG. 1, the verification code 122, the correlating factor 120, and the profile information 134 are sent to the identity provider 116, where the identity provider can verify that the verification code 122 and correlating factor 120 match, and as a result store the profile information 134 in the storage 118.

In some embodiments, the method 400 may be practiced where the correlating factor is based on a hash of the verification code.

In some embodiments, the method 400 may be practiced where the correlating factor is based on a session ID.

In some embodiments, the method 400 may be practiced where the correlating factor comprises a location of a hash of the data entity, where the location is a verification service, such as the verification service 132.

In some embodiments, the method 400 may be practiced where contacting an identity system to begin account provisioning comprises providing an account identifier. Such an account identifier may be, for example, an email address or a phone number.

Figure 5:
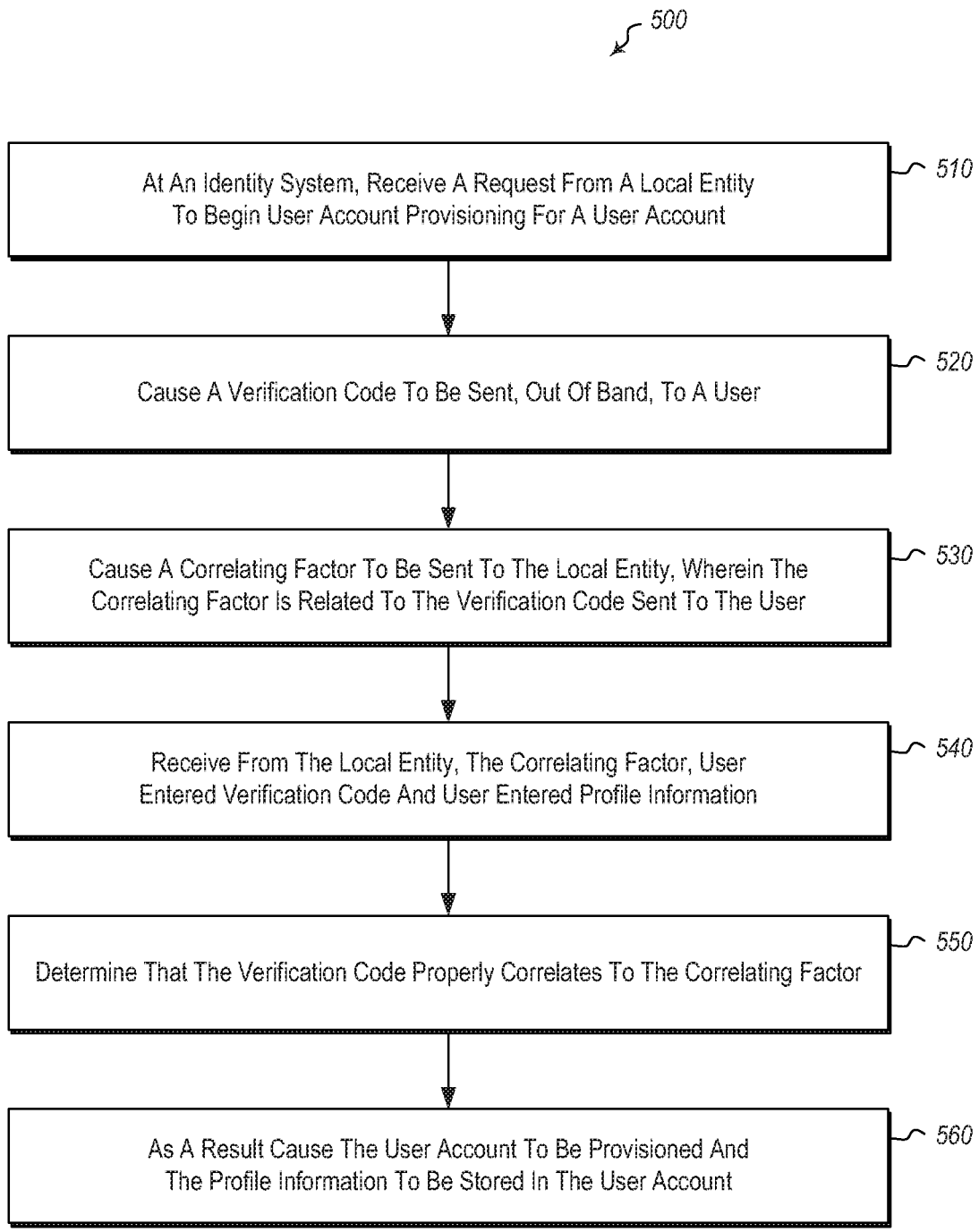
FIG. 5 illustrates another method of provisioning a user account.

Referring now to FIG. 5, a method 500 is illustrated. The method includes acts for provisioning a user account.

The method 500 includes, at an identity system, receiving a request from a local entity to begin user account provisioning for a user account (act 510). For example, the local entity 106 may send the email address 114 to the identity system 116, where it is received. This may indicate a desire to begin creating an account for the user 102.

The method 500 further includes causing a verification code to be sent, out of band, to a user (act 520). For example, FIG. 1 illustrates the verification code 120 being sent to the user 102

The method 500 further includes causing a correlating factor to be sent to the local entity, wherein the correlating factor is related to the verification code sent to the user (act 530). For example, FIG. 1 illustrates the identity system 116 send ng the correlation factor 122 to the local entity 106.

The method 500 further includes receiving from the local entity, the correlating factor, user entered verification code and the user entered profile information (act 540). For example, FIG. 1 illustrates the local entity 106 sending to the identity system the verification code 120, the correlation factor 122, and the profile information 134.

The method 500 further includes determining that the verification code properly correlates to the correlating factor (act 550). For example, the identity system 116 can determine that the verification code 120 properly hashes to a correlation factor 122. Alternatively, embodiments may examine a table that correlates session IDs with verification codes to determine when the verification code 120 correlates with a correlation factor.

As a result the method 500 further includes causing the user account to be provisioned and the profile information to be stored in the user account (act 560).

The method 500 may be practiced where the correlating factor is based on a hash of the verification code.

The method 500 may be practiced where the correlating factor is based on a session ID.

The method 500 may be practiced where the correlating factor comprises a location of a hash of the data entity, wherein the location is a verification service.

The method 500 may be practiced where the request from a local entity to begin user account provisioning for a user account comprises receiving an account identifier. Thus for example, the account identifier may include an email address or a phone number.

The method 500 may be practiced where causing a verification code to be sent, out of hand, to a user and causing a correlating factor to be sent to the local entity, comprises causing a separate verification service to: generate and store a session ID; generate and store the verification code associated with the session ID; send the verification code; generate the correlating factor; and send the correlating factor. Thus, as illustrated above, various actions may be performed by a separate verification service working in concert with the identity system.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer eluding computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be of braced within their scope.

What is claimed is:

1. A computer system comprising:
   one or more processors; and
   one or more computer-readable media having stored thereon instructions that are executable by the one or more processors to configure the computer system to provision a user account, including instructions that are executable to configure the computer system to perform at least the following:
      at a local entity, contact a remote identity system to begin provisioning the user account;
      at the local entity, automatically receive from the remote identity system a correlating factor related to a verification code which is also received from the remote identity system;
      at the local entity, receive profile information entered into the local entity that will be stored in the user account at the remote identity system only after the local entity has received both the correlating factor and the verification code;
      at the local entity, obtain the verification code corresponding to the correlating factor; and
      as a result of obtaining the verification code corresponding to the correlating factor, send the correlating factor, verification code, and the profile information from the local entity to the remote identity system to be used by the remote identity system to determine that the verification code correlates to the correlating factor, wherein upon determining that the verification code correlates to the correlating factor the remote identity system responsively provisioning the user account and then storing the profile information in the user account provisioned at the remote identity system.

2. The system of claim 1, wherein the correlating factor is based on a hash of the verification code.

3. The system of claim 1, wherein the correlating factor is based on a session ID.

4. The system of claim 1, wherein the correlating factor comprises a location where a hash of the verification code can be verified, wherein the location is a verification service.

5. The system of claim 1, wherein contacting an identity system to begin account provisioning comprises providing an account identifier.

6. The system of claim 5, wherein the account identifier comprises an email address.

7. The system of claim 5, wherein the account identifier comprises a phone number.

8. The system of claim 1, wherein the correlating factor is received at the local entity automatically through a web browser and the verification code is received through an email or an SMS.

9. The system of claim 8, wherein the received verification code is input by the user into the web browser prior to submitting the correlating factor, verification code, and profile information to the verification service.

10. A method of provisioning a user account:
at a local entity, contact a remote identity system to begin provisioning the user account;
at the local entity, based on contacting the remote identity system, automatically receive from the remote identity system a correlating factor that is related to a verification code that will be received at the local entity at a later time;
at the local entity, receive profile information entered into the local entity that will be stored in the user account at the remote identity system only after the local entity has received both the correlating factor and the verification code;
at the local entity, obtaining the verification code corresponding to the correlating factor; and
as a result of obtaining the verification code corresponding to the correlating factor, send the correlating factor, verification code, and the profile information from the local entity to the remote identity system to be used by the remote identity system to determine that the verification code correlates to the correlating factor such that determining that the verification code correlates to the correlating factor causes the remote identity system to responsively fully provision the user account and then store the profile information in the user account provisioned at the remote identity system.

11. The method of claim 10, wherein the correlating factor is based on a hash of the verification code.

12. The method of claim 10, wherein the correlating factor is based on a session ID.

13. The method of claim 10, wherein the correlating factor comprises a location where a hash of the verification code can be verified, wherein the location is a verification service.

14. The method of claim 10, wherein contacting an identity system to begin account provisioning comprises providing an account identifier.

15. The method of claim 14, wherein the account identifier comprises an email address.

16. The method of claim 14, wherein the account identifier comprises a phone number.

17. A method of provisioning a user account:
at a remote identity system, receiving a request from a local entity to begin provisioning the user account to be stored at the remote identity system;
in response to receiving the request, the remote identity system causing a verification code to be sent to the local entity;
at the remote identity system, causing a correlating factor to be sent to the local entity, wherein the correlating factor is related to the verification code sent to the user and is sent in a different manner than the verification code;
at the remote identity system, receiving from the local entity, the correlating factor, verification code, and user entered profile information;
at the remote identity system, determining that the verification code properly correlates to the correlating factor;
as a result of determining that the verification code properly correlates to the correlating factor, at the remote identity system, causing the user account to be fully provisioned; and
based upon the user account being fully provisioned, at the remote identity system, causing the profile information to be stored in the user account at the remote identity system.

18. The method of claim 17, wherein the correlating factor is based on a hash of the verification code.

19. The method of claim 17, wherein the correlating factor is based on a session ID.

20. The method of claim 19, wherein causing a verification code to be sent to the user and causing a correlating factor to be sent to the local entity, comprises causing a verification service separate from the remote identity system to at least:
generate and store the session ID;
generate and store the verification code associated with the session ID;
send the verification code;
generate the correlating factor; and
send the correlating factor.

21. The method of claim 17, wherein the request from a local entity to begin user account provisioning for a user account comprises receiving an account identifier.

22. The method of claim 21, wherein the account identifier comprises one or more of an email address or a phone number.

* * * * *